Jan. 18, 1966     C. A. BOYD ET AL     3,229,523
APPARATUS EMPLOYING VIBRATORY ENERGY
Filed Sept. 10, 1963     2 Sheets-Sheet 1
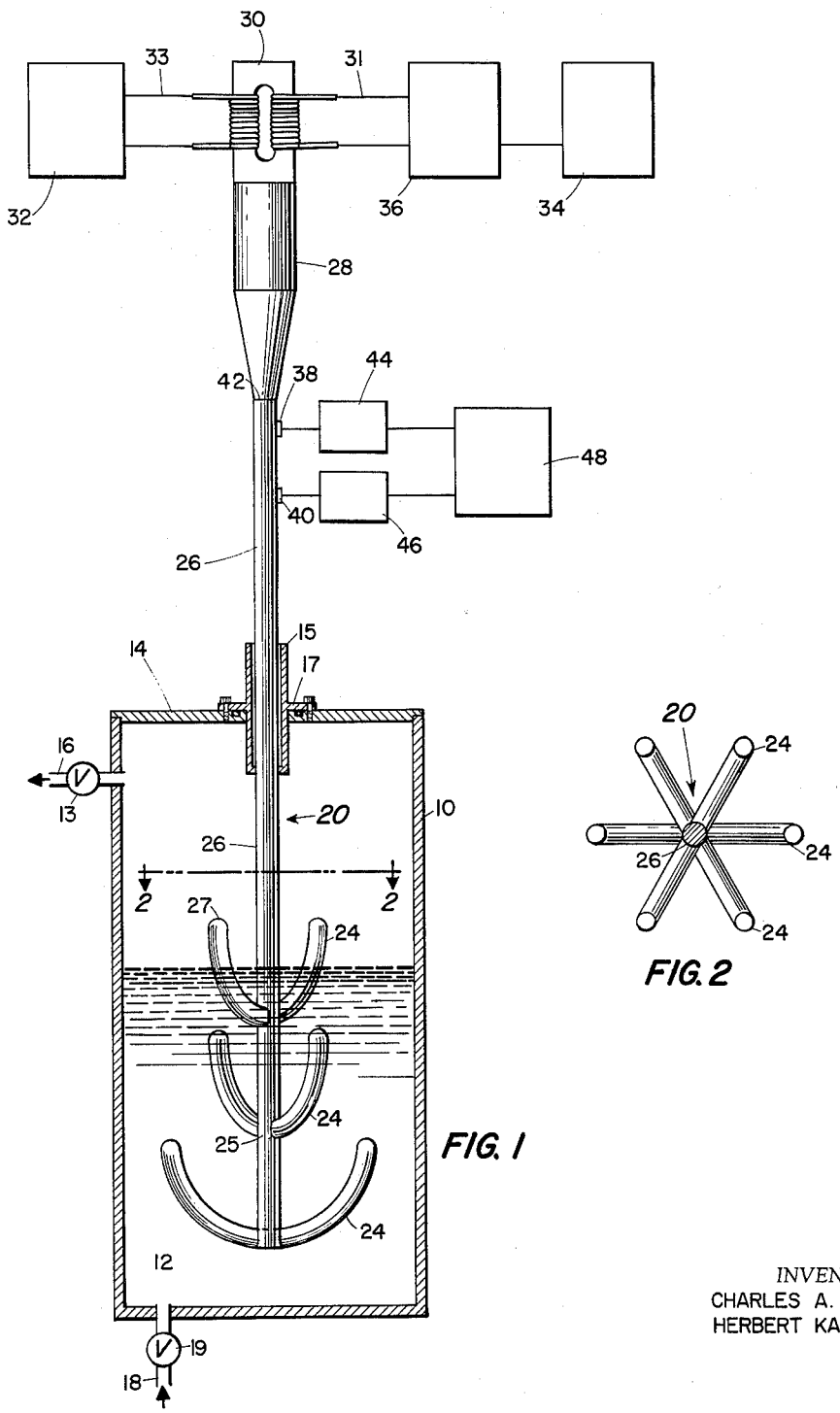
*INVENTORS.*
CHARLES A. BOYD
HERBERT KARTLUKE

United States Patent Office

3,229,523
Patented Jan. 18, 1966

3,229,523
APPARATUS EMPLOYING VIBRATORY ENERGY
Charles A. Boyd and Herbert Kartluke, West Chester, Pa., assignors, by mesne assignments, to the United States of America as represented by the United States Atomic Energy Commission
Filed Sept. 10, 1963, Ser. No. 308,016
8 Claims. (Cl. 73—290)

This invention relates generally to apparatus employing vibratory energy, especially for measuring the displacement of the surface level of liquid from a reference level, or for similar purposes. More particularly, the invention is concerned with improvements in sonic wave conductors suitable for use in apparatus of the kind set forth.

Devices have been proposed in the past for measuring liquid level by immersing an elongated conductor element in the liquid and propagating acoustic wave energy longitudinally along the conductor, as exemplified by the subject matter of U.S. Patent No. 2,998,723 issued September 5, 1961 and entitled "Sonic Wave Conductor". Such prior art devices are usually provided with a longitudinal series of fin-like members mounted on a long slender tube or rod, with each fin being spaced from its neighbor and extending outwardly from the rod or tube. It is the function of the fins to achieve improved sonic coupling between the wave conductor and the surrounding fluid so as to improve the sensitivity and over-all effectiveness of the apparatus.

Besides often giving only stepwise indications of liquid level, even though the liquid body has an infinitely variable surface level and even though a continuous level indicator is desirable or even necessary for certain applications, many prior art devices are not entirely satisfactory because of the sources of error either introduced or unprovided for. Thus, there may be inconsistencies and inaccuracies such as those resulting from unwanted standing wave patterns caused by reflections from the sides and bottom of the tank containing the liquid, between the top surface of a given fin and the surface of the liquid, and/or between the various fins as additional fins become immersed in the liquid. Moreover, drainage problems often exist, with the possibility of spurious indications as the result of entrapped liquid on the upper surface of the fins and/or entrapped air bubbles on the lower surface of the fins, when increases or reductions in liquid level occur. Close-together spacing of an infinite number of such fins does not solve such problems, but only introduces further possibility of error from vibratory interaction between immersed neighboring fins.

According to the present invention, a sonic conductor is provided which comprises an elongated acoustical coupling member adapted to be immersed in a liquid body for propagating acoustic wave energy along its length, and a longitudinally spaced series of curved acoustical couplers or sensors. Each sensor has a lower or closed end portion thereof connected to the elongated coupling member, an intermediate portion which extends outwardly and upwardly, and a free or upper end portion which is at the level of the lower or closed end of the above neighboring sensor.

For the purpose of illustrating the invention, there is shown in the drawings forms which are presently preferred, it being understood, however, that this invention is not limited to the precise arrangements and instrumentalities shown.

FIGURE 1 is a cross sectional view of an embodiment utilizing the principles of the present invention.

FIGURE 2 is a cross sectional view taken along line 2—2 of FIGURE 1.

Figure 3:
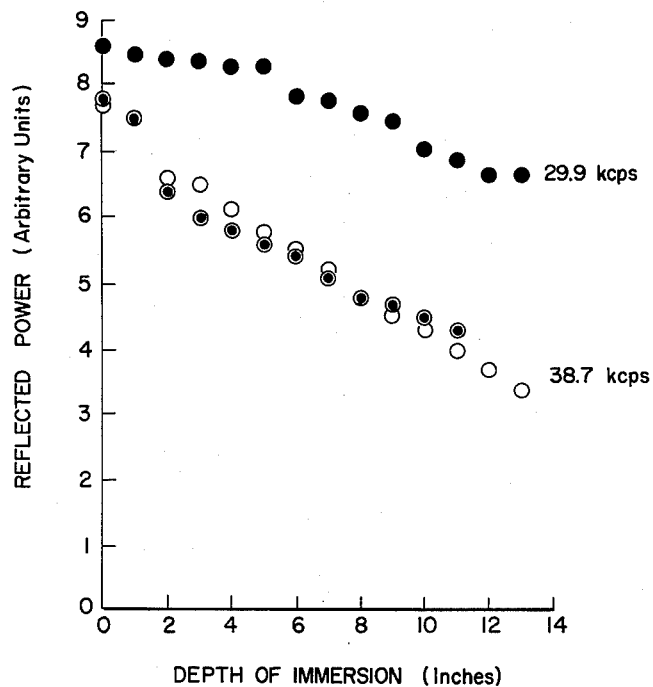
FIGURE 3 shows change in reflected power as a function of immersion depth, being results of experiments conducted with apparatus of the present invention.

Referring to the drawings in detail wherein like numerals indicate like elements, there is shown in FIGURE 1 a tank 10 for containing a variable quantity of water 12 and/or other fluid. The tank 10 includes a cover 14, an outlet pipe 16 with valve 13, and an inlet pipe 18 with valve 19.

In order that the liquid level may be externally indicated, an elongated sonic wave conductor or transducer-coupling system 20 is provided, comprising elements 30, 28, 26, and three elements 24. The system 20 has its upper end portion extending for an appreciable distance above the tank cover 14 and therefore outside of the tank 10, while its lower portion extends through an opening in the cover 14 into the tank.

The transducer element 30 of system 20 may be of the magnetostrictive type and of conventional construction as shown, comprising a half-wavelength-long laminated core of nickel, nickel-iron alloy, or other magnetostrictive material, properly dimensioned to insure axial resonance with the frequency of alternating current applied thereto by coil 31 so as to cause it to change in length according to its coefficient of magnetostriction. The detailed construction of a suitable magnetostrictive transducer is well known to those skilled in the art and does not form a part of the present invention and, accordingly, no description of its construction will be made herein. It will be appreciated by those skilled in the art in place of the magnetostrictive transducer 30 shown in the drawing, other known types of transducers may be substituted; for example, electrostrictive or piezoelectric transducers made of barium titanate, quartz crystals, lead zirconate titanate, etc., may be utilized.

For powering the transducer 30, coil 31 is connected to a power supply 34 incorporating a suitable oscillator and amplifier; such equipment is well known to the art. The power applied to coil 31 can be measured by means such as A.-C. wattmeter 36.

The transducer 30 is also provided with a polarizing coil 33, the desirability of magnetically polarizing the magnetostrictive transducer 30 by means of polarizing coil 31 in order for the metal laminations in transducer 30 to efficiently convert the applied energy from excitation coil 31 into elastic vibratory energy being readily understood by those skilled in the art. Low voltage direct current can be supplied to coil 33 from a supply 32 such as a battery, rectifier, etc.; such sources and their use in this connection are well known.

The aforesaid power supply 34, in a typical example, is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred frequency would be in the range of from about 3,000 to about 60,000 cycles per second, with the optimum being between about 14,000 to about 50,000 cycles per second. Normally, a frequency is chosen which will provide a suitable size of apparatus for a given application or set of applications, with a frequency in the ultrasonic range having the advantage of inaudibility for reasons of operator comfort.

Thus, transducer-coupling system 20 may be constructed to operate in resonance at a frequency of 28,000 cycles per second, for example.

As is well known to the art, the electrical frequency of the alternating current power supply (such as 60 cycles per second) is changed to match the mechanical or elastic vibratory frequency of the transducer (28,000 cycles per second in this example, as aforesaid).

The elements or acoustical coupling members 28, 26, and 24 are essentially acoustic transmission lines, and are preferably made from a low attenuation metal such as Monel, aluminum-bronze, beryllium-copper, etc., although special materials may be used for special purposes including corrosion-resistant materials for severe liquid environments so long as such materials will vibrate suitably.

Tapered acoustical coupling member 28 is essentially a mechanical transformer and is of contoured construction, for purposes including the increasing of the amplitude of vibration, such as the construction set forth at page 163 of Piezoelectric Crystals and Ultrasonics by Warren P. Mason, published in 1950 by Van Nostrand Company. Thus, tapered member 28 may be shaped so as to have a taper that is an exponential function of its length and satisfies the following equation:

$$S = S_0 e^{-2Tl}$$

where S is the reduced area at any section of the tapered member 28, $S_0$ is the area of the non-tapered portion, T is a constant describing the taper, and l is the length of the tapered member.

The larger end (lesser amplitude end) of tapered member 28 is connected in end-to-end contact, preferably by brazing or some other type of metallurgical joint, to one end of transducer 30.

The smaller end (greater amplitude end) of tapered member 28 is connected in end-to-end contact, preferably by brazing or some other type of metallurgical joint, to one end of acoustical coupling member 26.

Coupling member 26 of FIGURE 1 is of rod-like construction and can be of substantial length with no immediately evident limits. Its length may therefore be adjustable in accordance with the depth of the tank or other vessel in which it is to be used, consonant, of course, with the length limitations necessitated by most efficient operation at a given frequency, such as a resonant frequency, which involve the one-half wavelength (or unit multiples thereof) dimensioning well known to the art. As will be appreciated, for a given material and geometry, the higher the frequency, the shorter the physical length corresponding to a given acoustical length, and vice versa.

Coupling member 26 carries a vertical series of horn-like acoustical coupling members or sensors 24 at the lower end thereof, each of the sensors 24 having the same construction as that of the other sensors 24.

Each of sensors 24 of FIGURE 1 is of rod-like construction and extends outwardly and longitudinally of coupling member 26 so that neighboring sensors 24 are in longitudinally overlapping relationship. Each of sensors 24 has a closed end portion 25 and a free end portion 27, with said closed end portion 25 attached to coupling member 26 and the free end portion 27 extending in a longitudinal direction so as to be in overlapping relationship with at least the closed end portion of a neighboring sensor 24. Thus, each of the sensors 24 may be formed into a U-shape or semicircle having a selected radius.

Each sensor 24 is fixedly joined, as by brazing, to coupling member 26. While it is to be understood that the sensors 24 may be aligned all in the same plane, in the embodiment of FIGURE 1, the sensors 24 are each in a slightly different plane, because of their differing rotational placements around the axis of the coupling member 26, for purposes of further minimizing interfering reflections. In a preferred embodiment, sensors 24 are equiangularly spaced about coupling member 26. This accounts for the seemingly disproportionate length of the bottom sensor 24 and of the distance along coupler 26 between bottom sensor 24 and the next higher-placed sensor 24 in FIGURE 1. FIGURE 2 further illustrates this rotational arrangement, being a view taken along line 2—2 of FIGURE 1.

While the sensors 24 are preferably made from one piece each, each having a hole through its center for purposes of being joined to and along coupling member 26, each horn of each sensor 24 (a "horn" representing the length between the closed end portion 25 and a free end portion 27, each sensor 24 having two such horns) may be made as a separate piece and appropriately joined to coupling member 26 accordingly, with due observation of vibrational requirements, as is explained herein.

In one embodiment, designed to operate at a nominal resonant frequency of 28 kilocycles per second, coupling member 26 was made of one-half-inch-diameter Type 303 stainless steel and had a length of 21.875 inches. Sensors 24 were made of 0.795-inch-diameter Type 303 stainless steel and each had a length of 11.153 inches, each being formed into a semicircle having a radius of 3.550 inches. The radius was selected so that, when the sensors 24 were placed at regions along coupling member 26 which were one-half wavelength apart, the rising liquid would simultaneously cover the lower sensor 24 and touch the next higher sensor 24 so as to produce substantially continuous indication. In this particular 28 kc. embodiment, the distance from a free end portion 27 of a sensor 24 to the corresponding free end portion 27 of the next lower sensor 24 was $3^{35}/_{64}$ inches.

While transducer 30, tapered member 28, and coupling member 26 all vibrate in an axial or longitudinal mode of vibration (see description of longitudinal vibration of bars, at pages 62–64 of Elements of Acoustical Engineering by Harry F. Olson, 2nd edition, 1947, D. Van Nostrand Comany, Inc.), sensors 24 vibrate in a flexural mode of vibration (see description of transverse vibration of bars, at pages 52–56 of the same text). Coupling member 26 and sensors 24 are preferably joined in an antinode-to-antinode (loop to loop) arrangement for purposes of maximum transfer of energy from member 26 to sensor 24. Therefore, dimensioning of sensors 24 is preferably in accordance with FIG. 3.2D (page 52) of the aforesaid book by Olson, especially at the fundamental frequency or the second or other even-numbered overtone thereof in view of the aforesaid joining arrangement. Each of sensors 24 preferably has a physical length corresponding to an acoustical one-half wavelength (or whole unit multiple thereof).

Preferably, for support purposes and to minimize frequency shift of the vibratory apparatus and loss of vibratory energy to the associated supporting members, the system 20 is supported by a force-insensitive mount 15 (see U.S. Patent No. 2,891,180 entitled "Support for Vibratory Devices" and issued in the name of William C. Elmore). Such force-insensitive mount 15 may comprise a cylindrical steel shell having a length of one-half wavelength at the applied frequency and having a radially outwardly extending flange 17 at its one-quarter wavelength point or midpoint. Such mount 15 may be fixedly joined, as by brazing, to coupling member 26, preferably at an antinodal or loop region of the vibration on coupling member 26 (as at region 19) with only one end of the mount 15 being so joined and the remainder of the mount 15 being free from attachment to coupling member 26. The flange 17 of mount 15 is fixedly joined to tank cover 14 of tank 10, in such manner as to provide a hermetic seal. It is to be noted that the joinder of the one end of the mount 15 to coupling member 26 constitutes another hermetic seal.

System 20 is also provided with acoustic power measuring apparatus, comprising sensing elements 38 and 40 and appropriate read-out instruments, such as electronic read-out instruments which can be attached to sensing elements 38 and 40 by electrical cables.

The character, location, and operation of the acoustic power measuring apparatus in connection with method and apparatus for liquid level detection are set forth in detail in co-pending applicaton Serial No. 282,180 filed May 21, 1963, for "Method and Apparatus Utilizing Vibratory Energy," the disclosure of which is incorporated herein by reference.

Thus, the sensing elements 38 and 40 may be small electromechanical transducers, such as two barium titanate wafers, attached at suitable intervals one-quarter wavelength apart (i.e., one at a loop or antinode region and the other at a nodal region of the vibration) on coupling member 26, these attachment points along a portion of member 26 which is outside of the tank 10. The sensing elements 38 and 40 will produce an alternating electrical signal proportional to the alternating mechanical displacement of a particle at the point of attachment. These elements are acceleration-sensitive and the mechanical acceleration is 180 degrees out of phase with the displacement.

The efficiency of power delivery to the load terminating the system 20 greatly depends upon the impedance of the terminal load, which, in the case of the present invention, refers to the immersion status of one or more of the sensors 24 in the liquid whose level is to be monitored.

With the apparatus of the present invention, there are changes in delivered power and/or shifts in phase which will occur in the apparatus according to the immersion status in the liquid of one or more of the sensors 24. With appropriate instrumentation, such as that above described and shown, these changes can be read out so as to give indications of the level of the liquid in the tank or other vessel which can then be compared, if desired, with the readings known to be obtainable at a given reference or limit level. Any necessary adjustments in liquid level can then be made, as by use of the pipes 16 or 18.

While the present invention is generally applicable to liquid level determination situations, it has particular utility in connection with the safe and efficient operation of nuclear reactors fueled with molten salt or liquid metals. Here, where it is desired to always maintain the liquid level between specified upper and lower limits, the high-temperature and high-corrosion environment place severe limitations on conventional types of level-sensing instruments.

With the present invention, the sonic conductor can be made of appropriate length so that the temperature- and radiation-sensitive parts of the equipment (transducer, windings, generating equipment, and appropriate auxiliary gear) can be located conveniently outside of the extraordinary environment, with only the terminal end in the environment. Screw-connection of coupling member 26 to tapered member 28 renders the terminal end of system 20 containing sensors 24 replaceable in the event of undesired corrosion or other effects thereon.

The curves plotted in FIGURE 3 show change in reflected power as a function of immersion depth, in connection with water level determinations, wherein the sensitivity of apparatus of the present invention was tested.

In order to obtain the data illustrated by these curves, the excitation coil 33 of transducer 30 was connected to an ultrasonic power generator 34 which was so adjusted as to have a sinusoidal output of 38.7 kilocycles per second. The power applied to the excitation coil 33 was measured by A.C. wattmeter 36 and was maintained at a value of 1.5 watts throughout the experiments. The polarizing coil of transducer 30 was connected to a low-voltage D.-C. supply 32. The sensing element 38, located at a loop of the vibration along coupling member 26, was connected to an electronic voltage amplifier 44, whose output was connected to the voltage terminals of a sensitive A.-C. wattmeter 48. The sensing element 40, located at a node of the vibration along coupling member 26, was connected to an attenuator 46 whose output was connected to the voltage terminals of the wattmeter 48. Proper adjustment of the amplifier 44 was required in order to produce outputs of the correct magnitude for suitable operation of the wattmeter 48 which, when connected as described, indicated the acoustic power reflected back to the transducer 30 from the load presented by the medium in which the terminal end of system 20 was immersed.

Water at room temperature was admitted to the tank 10 through inlet pipe 18, until the surface of the water just touched the lowest-placed sensor 24 (at the midpoint of its closed end portion 25) on the system 20. A reading of the wattmeter 48 was taken and recorded, and then water was added in one-inch increments, a wattmeter reading being recorded after each addition of water.

As shown by FIGURE 3, there was a continuous and steady decrease in reflected power with increased immersion status of sensors 24 and the terminal end of coupling member 26.

The tests were conducted at several frequencies to determine which produced maximum sensitivity in this application. Other frequencies, such as the 29.9 kilocycles per second indicated in FIGURE 3, were less sensitive than 38.7 kilocycles per second which was found to give the greatest change in electrical read-out with liquid-level change. The uniformity of response was notable, as was the absence of standing-wave interference or other interference patterns.

An apparatus embodiment capable of operating at 50–60 kilocycles per second would enable the inclusion of more sensors 24 in a practical system length, as well as the use of smaller sensors 24 (radius less than 2 inches), making for both greater sensitivity and greater adaptability to entry and removal through a small opening and operation in close geometries.

While the apparatus of the present invention has been shown and described as having three sensors 24, it will be appreciated that the number of sensors 24 may be adjusted according to the application to which the invention is to be applied.

The present invention may be embodied in other specific forms without departing from the spirit or essential attributes thereof and, accordingly reference should be made to the appended claims rather than to the foregoing specification as indicating the scope of the invention.

We claim:

1. A liquid level probe comprising an elongated coupling member, at least two spaced sensors extending outwardly and longitudinally of said member, neighboring sensors being in longitudinally overlapping relationship, and means for propagating acoustic wave energy longitudinally through said coupling member to said sensors to cause vibratory displacement of said sensors, each of said sensors being located in a flat plane, the plane of each of said sensors being equiangularly spaced from the plane of every other sensor.

2. The liquid level probe of claim 1 wherein each of said sensors has a closed end portion and a free end portion, each sensor being attached at its closed end portion to said coupling member, the free end portion of said sensor extending in a longitudinal direction at least to the extent that the free end portion and a closed end portion of a neighboring sensor are in overlapping relationship, and said sensors having a physical length corresponding to a whole number multiple of one-half wavelength of vibratory energy in said sensors.

3. The liquid level probe of claim 1 wherein said sensors are U-shaped with two free end portions, each sensor having its free end portion extending toward said means.

4. A liquid level probe comprising an elongated coupling member, at least two spaced sensors extending outwardly and longitudinally of said member, neighboring sensors being in longitudinal overlapping relationship, means for propagating acoustic wave energy longitudinally through said coupling member to said sensors to cause vibratory displacement of said sensors, each of said sensors having a closed end portion and a free end portion, each sensor being attached at its closed end portion to said coupling member, the free end portion of said sensor extending in a longitudinal direction at least to the extent that the free end portion and the closed end portion of a neighboring sensor are in overlapping relationship, said sensors being U-shaped with two free end portions, said U-shaped sensors being semicircular, the closed end portion of each of said sensors being connected at its midpoint to said coupling member, the closed end portion of each sensor being spaced from the closed end portion of the next adjacent sensor a distance slightly less than the radius of each of said sensors.

5. The liquid level probe of claim 1 including acoustic power measuring apparatus, the acoustic power measuring apparatus being coupled to said member to measure the power utilized by said coupling member and said sensors.

6. The liquid level probe of claim 5 including mounting means, said mounting means supporting said coupling member and said sensors above a liquid whose level is to be measured, said acoustic power measuring apparatus being connected to said coupling member on the side of said mounting means spaced from said sensors, said means for propagating acoustic wave energy being connected to said coupling member on the same side thereof as said acoustic power measuring apparatus.

7. A liquid level probe comprising an elongated coupling member, at least two spaced sensors extending outwardly and longitudinally of said member, adjacent sensors being in longitudinally overlapping relationship, means coupled to said member for propagatnig acoustic wave energy longitudinally through said member to said sensors, acoustic power measuring apparatus coupled to said member to measure the power being transmitted by said member and said sensors, said apparatus including two electromechanical sensing elements connected to said member at spaced points on said member, one element being located at a node on said member, the other element being located at an antinode on said member, and the node and antinode on said member being between said means and the closest sensor thereto.

8. A probe in accordance with claim 7 wherein said sensors are U-shaped with their free ends extending towards said means, with each sensor having a length corresponding to a whole number multiple of an acoustical one-half wavelength according to the properties of the sensor and the intended operating frequency.

References Cited by the Examiner
UNITED STATES PATENTS

| | | | |
|---|---|---|---|
| 2,990,543 | 6/1961 | Rod | 73—67.1 X |
| 2,998,723 | 9/1961 | Smith et al. | 73—290 |
| 3,133,442 | 5/1964 | Werner | 73—290 |
| 3,184,968 | 5/1965 | Werner | 73—290 |

LOUIS R. PRINCE, *Primary Examiner.*

ISAAC LISANN, *Examiner.*

F. H. THOMSON, *Assistant Examiner.*